Jan. 30, 1934.  C. W. KOCH ET AL  1,945,197
FASTENING MEANS FOR FURNITURE
Filed June 18, 1932
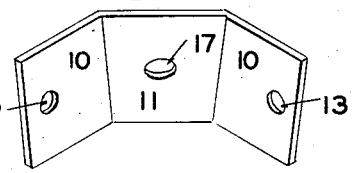
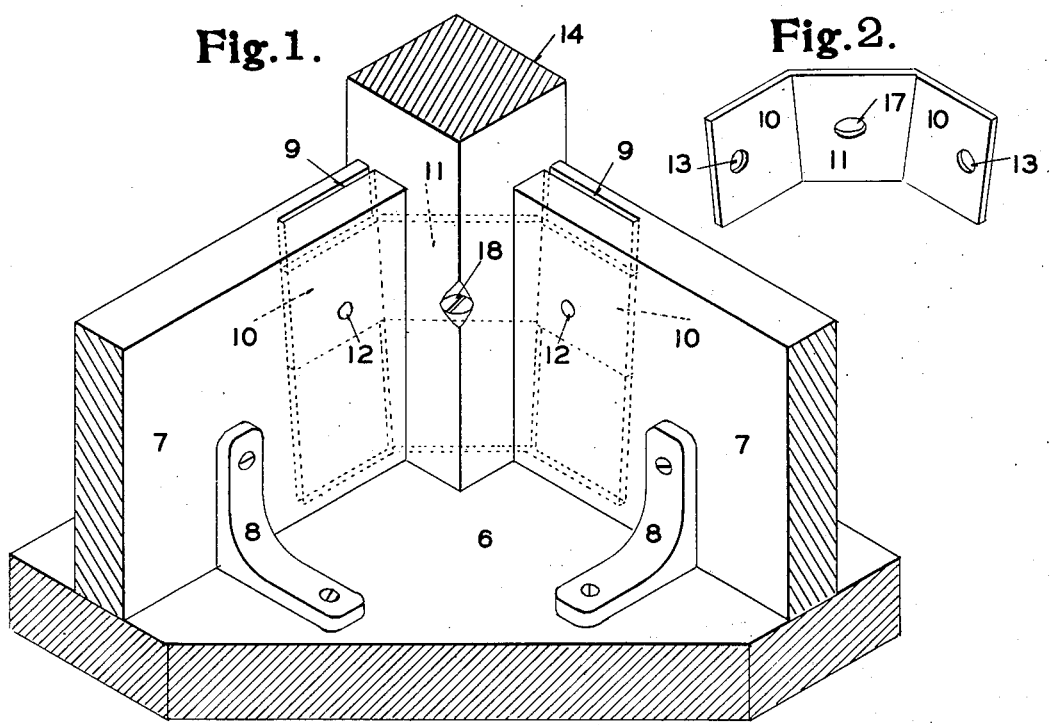
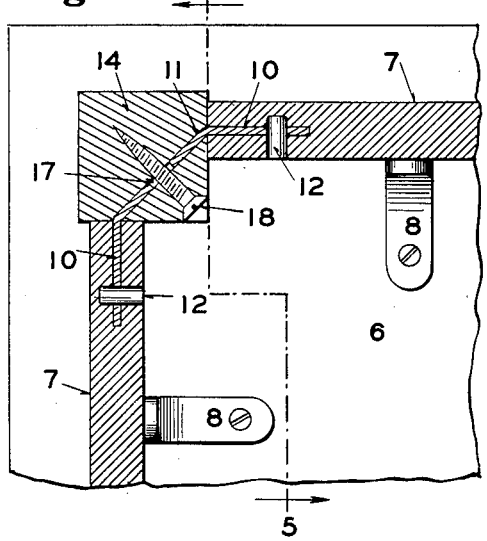
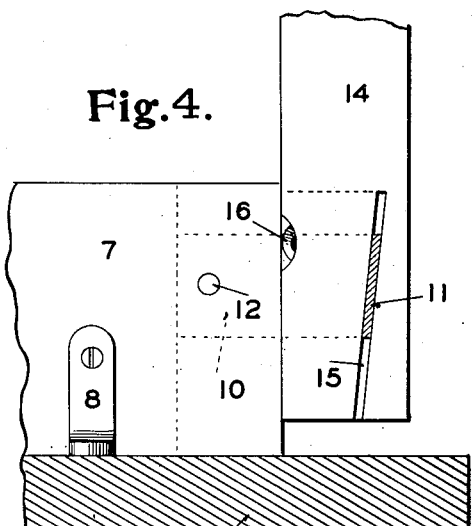
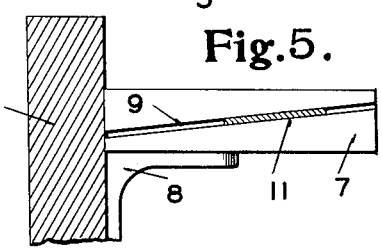
Inventors
C. W. Koch
F. L. Koch
By (signature)
Att'y.

UNITED STATES PATENT OFFICE 1,945,197

FASTENING MEANS FOR FURNITURE

Clarence W. Koch and Fred L. Koch, St. Louis, Mo.

Application June 18, 1932. Serial No. 617,928

3 Claims. (Cl. 45—48)

Our invention relates to fastening means for furniture and while particularly adapted for use in securing in position the legs of tables, desks and the like, it is applicable for use in similar structures in which a support or strut is to be secured in abutting relation to the ends of a pair of rails positioned in angular relation to each other.

The object of our invention is to provide simple and effective means for securing a table leg or equivalent member in position so that it will not be liable to become "wobbly" in use either through inherent weakness of the structure or due to shrinkage of the wood of which the parts are composed; and at the same time to provide what is known as a "knock-down" construction, that is, one which may be conveniently disassembled for shipping purposes.

In the accompanying drawing, which illustrates one form of our invention as applied to a table construction, Figure 1 is a perspective view of one corner of a table looking from the lower side; Figure 2 is a perspective view of the tie plate; Figure 3 is a horizontal section; Figure 4 is a section taken on the line 4—5 of Figure 3 looking in the direction indicated by the upper arrow, but showing the leg in a partially asembled position; and Figure 5 is a section taken on the line 4—5 of Figure 3, but looking in the direction indicated by the lower arrow.

The table top 6 has secured to it the rails 7. Any usual fastening means may be employed for the purpose, such as the metal brackets 8. Formed in the end of each rail is a kerf 9 for the reception of one end of the tie plate. The kerfs are made of sufficient depth to provide an effective bearing for the ends of the plate and are inclined inwardly from the free edge of the rail to the table top, as best shown in Figure 5. The tie plate is formed of a rectangular piece of sheet metal bent (as shown in Figure 2) to form ends 10 adapted to enter the kerfs, and a connecting part 11. The ends 10 extend in a direction at right angles to each other and lie in planes inclined to the perpendicular at the same angle as the kerfs 9. This positions the connecting portion 11 in a plane inclined to the perpendicular with respect to the table top. The ends of the plate are secured in the kerfs 9 by any suitable means, such as dowel pins 12 passing through holes 13 in said ends. Formed in the end of the table leg 14 is a kerf 15 extending diagonally across the end and in a plane inclined to the axis of the leg at the same angle to the perpendicular as the connecting part 11 of the tie plate. A screw hole 16 is positioned in the part 11 so as to align with a hole 17 in the plate when the parts are assembled. This hole is adapted to receive a screw 18 for securing together the two parts into which the end of the leg is divided by the kerf 15.

To assemble the parts, the ends 10 of the tie plate are inserted in the kerfs 9 and secured in position before the rails are attached to the table top as, on account of the inclination of the kerfs 9, it is impossible to insert the plate after the rails are attached to the top. The leg is now attached by inserting the central part 11 of the tie plate into the kerf 15 and moving it lengthwise toward the top. Due to the inclination of the plate 11 and kerf 15 to a plane normal to the table top, this lengthwise movement will result in a lateral movement of the leg in a diagonal direction, causing its sides to approach the ends of the rails. The parts should be so proportioned that the sides will come in contact with the ends of the rails slightly before the end of the leg contacts with the table top (as shown in Figure 4). The leg is now driven home, either by pressure or blows, slightly compressing the material of the rails, or of the leg, or both, with the result that an extremely firm and rigid joint is produced. After the leg is brought to its final position with the end against the table top, the screw 18 is inserted to fasten together the two parts into which the end of the leg is divided by the kerf 15. The purpose of this fastening is to prevent the possibility of the leg being caused to split at the end of the kerf by lateral pressure exerted on the lower end of the leg when the table is in use. While we have shown the screw 18 as passing through the tie plate, it may pass between the plate and the table top. We prefer the construction shown, however, in order that the plate 11 may prevent the sides of the kerf from being drawn together by excessive pressure of the screw, thus causing a slight distortion of the end of the leg.

It will be seen that our construction, while extremely simple and inexpensive to manufacture, provides a rigid and permanent joint which is not liable to become loose through shrinkage and which permits the leg to be readily removed for the purpose of shipping the article in "knock-down" condition. Furthermore, when the leg is removed, the rails are firmly connected by the tie plate and hence injury to the rails during shipment is lessened.

Another advantage of our construction is that the wedging action has no tendency to spread the rails, as is the case where the leg is drawn against the ends of the rails by a lag screw passing through a corner bracket secured to the inner face of the rails, a construction now in common use. While our construction provides a permanently tight joint when made of properly dried lumber, it may happen, through the use of imperfectly cured lumber, that a slight looseness will develop through shrinkage. In such case it is only necessary to detach the leg and remove a short piece of its end so that it may be driven further home to compensate for the shrinkage. To provide for this the kerf 15 may be made deeper than is normally necessary and the screw hole 17 may be made larger or elongated.

Where, in the claims, we have used the term "rails" we wish to be understood as including similar parts whether or not technically so known in the art. We further intend to include by the term "leg", a brace, strut, or support whether attached at one or both ends.

Having fully described our invention, what we claim as new and desire to secure by Letters Patent of the United States is:

1. In a device of the class described, the combination of a pair of rails disposed at an angle to each other and having a space between their adjacent ends, said rails having inclined kerfs formed in their ends, a tie plate secured in said kerfs and extending between the ends of the rails and inclined at an angle determined by the position of said kerfs, and a leg positioned in the space between the end of said rails, said leg being provided with a longitudinal kerf inclined at an angle corresponding to the angle of said tie plate and engaging therewith, whereby longitudinal movement of the leg wedges the leg against the ends of the rails.

2. In a device of the class described, the combination of a pair of rails disposed at an angle to each other and having a space between their adjacent ends, said rails having inclined kerfs formed in their ends, a tie plate secured in said kerfs and extending between the ends of the rails and inclined at an angle determined by the position of said kerfs, a leg positioned in the space between the end of said rails, said leg being provided with a longitudinal kerf inclined at an angle corresponding to the angle of said tie plate and engaging therewith, whereby longitudinal movement of the leg wedges the leg against the ends of the rails, and means passing through the tie plate for securing together with parts of the leg separated by the kerf.

3. In a device of the class described, the combination with a table top, of a pair of rails secured thereto, said rails being disposed at an angle to each other and having a space between their adjacent ends, kerfs formed in the ends of said rails, said kerfs being inclined to a plane normal to the table top, a tie plate having its ends secured in said kerfs thereby forming a tapered socket of which the ends of the rails form a part, and a leg provided with an inclined kerf engaging with the tie plate whereby two sides of the leg are wedged directly against the ends of the rails to form a rigid structure.

CLARENCE W. KOCH.
FRED L. KOCH.